(12) United States Patent
Holt et al.

(10) Patent No.: US 12,203,812 B2
(45) Date of Patent: Jan. 21, 2025

(54) BRACKET FOR TEMPERATURE SENSOR (71) Applicant: Emerson Digital Cold Chain, Inc., Kennesaw, GA (US)

(72) Inventors: Nick Holt, Sydney (AU); Eric Bengston, St. Louis, MO (US); Jeffrey Yaeger, Peachtree City, GA (US)

(73) Assignee: Copeland Cold Chain LP, Kennesaw, GA (US)

( * ) Notice: Subject to any disclaimer, the term of this patent is extended or adjusted under 35 U.S.C. 154(b) by 486 days.

(21) Appl. No.: 17/681,998

(22) Filed: Feb. 28, 2022

(65) Prior Publication Data
US 2022/0276099 A1 Sep. 1, 2022

(30) Foreign Application Priority Data

Mar. 1, 2021 (AU) .............................. 2021201316
Mar. 5, 2021 (CA) ...................................... 3111127

(51) Int. Cl.
*G01K 1/14* (2021.01)

(52) U.S. Cl.
CPC .............. *G01K 1/146* (2013.01); *G01K 1/14* (2013.01)

(58) Field of Classification Search
CPC .................................. G01K 1/146; G01K 1/14
See application file for complete search history.

(56) References Cited

U.S. PATENT DOCUMENTS

| 3,396,582 | A | * | 8/1968 | Louks | G01K 5/26 374/E5.016 |
| 3,636,770 | A | * | 1/1972 | Chaney | G01K 5/025 374/194 |
| 4,627,741 | A | * | 12/1986 | Faller | G01K 5/04 374/E5.004 |
| 5,386,432 | A | * | 1/1995 | Ficalora | G01C 19/661 372/65 |

(Continued)

FOREIGN PATENT DOCUMENTS

| AT | A206686 A | 9/1989 |
| AT | 390317 B | 4/1990 |

(Continued)

OTHER PUBLICATIONS

Canadian Office Action for CA3111127 which claims priority to the same parent application as the instant application; dated Jan. 9, 2023; 5 pages.

(Continued)

*Primary Examiner* — Nathaniel T Woodward
*Assistant Examiner* — Philip L Cotey
(74) *Attorney, Agent, or Firm* — Harness, Dickey & Pierce, P.L.C.; Anthony G. Fussner (57) ABSTRACT

Disclosed are exemplary embodiments of mounting brackets or clips for temperature sensors. The mounting brackets are configured with multiple mounting features that enable temperature sensors to be mounted at different locations. In an exemplary embodiment, a mounting bracket includes first and second mounting features or means configured for (Continued)

selectively attaching the mounting bracket and temperature sensor to a surface via the first mounting feature, or hanging the mounting bracket and temperature sensor from a fixture via the second mounting feature.

27 Claims, 10 Drawing Sheets

(56) References Cited

U.S. PATENT DOCUMENTS

| | | | | |
|---|---|---|---|---|
| 5,704,692 | A * | 1/1998 | Purdy | B23K 9/0026 |
| | | | | 219/137 R |
| 5,987,971 | A * | 11/1999 | Sahm | G01N 9/18 |
| | | | | 62/50.7 |
| 6,895,642 | B2 * | 5/2005 | Huang | F16M 13/022 |
| | | | | 248/205.5 |
| 7,597,472 | B2 * | 10/2009 | Hang | G01K 1/143 |
| | | | | 374/208 |
| 8,544,352 | B2 * | 10/2013 | Glatzel | G01F 1/684 |
| | | | | 73/204.22 |
| 8,709,949 | B2 * | 4/2014 | Hampp | B08B 7/0057 |
| | | | | 216/73 |
| 8,760,310 | B2 * | 6/2014 | Rosener | H04M 1/05 |
| | | | | 340/686.4 |
| 9,261,413 | B2 * | 2/2016 | Nishida | G01K 1/14 |
| 9,348,275 | B2 * | 5/2016 | Fukunaga | G03G 15/2028 |
| 9,506,814 | B2 * | 11/2016 | Nishida | H01M 10/486 |
| 10,067,004 | B1 * | 9/2018 | Allen | G01K 13/00 |
| 10,101,211 | B2 * | 10/2018 | Coombes | H05B 47/165 |
| 10,837,840 | B2 * | 11/2020 | Zhou | G01K 7/00 |
| 2002/0189058 | A1 * | 12/2002 | Budden | G01K 1/14 |
| | | | | 374/E1.018 |
| 2004/0064218 | A1 * | 4/2004 | Schanin | H02J 3/14 |
| | | | | 700/286 |
| 2009/0190630 | A1 * | 7/2009 | Hong | G01K 1/143 |
| | | | | 374/208 |
| 2010/0109895 | A1 * | 5/2010 | Rosener | H04M 1/05 |
| | | | | 340/686.1 |
| 2012/0285923 | A1 * | 11/2012 | Hampp | B08B 7/0057 |
| | | | | 216/13 |
| 2014/0010266 | A1 * | 1/2014 | Nishida | G01K 1/14 |
| | | | | 374/208 |
| 2014/0173926 | A1 * | 6/2014 | Hampp | B08B 7/0057 |
| | | | | 34/90 |
| 2014/0233606 | A1 * | 8/2014 | Nishida | G01K 1/14 |
| | | | | 374/208 |
| 2016/0169713 | A1 * | 6/2016 | Graff | F24F 11/30 |
| | | | | 73/431 |
| 2018/0100766 | A1 * | 4/2018 | Coombes | F21V 23/0457 |
| 2018/0372555 | A1 * | 12/2018 | Allen, Sr. | G01K 1/024 |
| 2019/0130351 | A1 * | 5/2019 | Arena | G06Q 10/0833 |
| 2019/0316970 | A1 * | 10/2019 | Zhou | G01K 7/00 |
| 2019/0372435 | A1 * | 12/2019 | Song | H02K 11/25 |
| 2020/0191620 | A1 * | 6/2020 | Kasai | B60R 11/04 |
| 2020/0319155 | A1 * | 10/2020 | Pratt | G01N 33/0031 |
| 2021/0069371 | A1 * | 3/2021 | Mushtaq | A61L 9/14 |
| 2022/0382325 | A1 * | 12/2022 | Kuwabara | A61B 5/01 |

FOREIGN PATENT DOCUMENTS

| | | |
|---|---|---|
| AT | A114089 A | 9/1992 |
| CN | 2757103 Y | 2/2006 |
| CN | 101392941 A | 3/2009 |
| CN | 201389176 Y | 1/2010 |
| CN | 201434427 Y | 3/2010 |
| CN | 201666829 U | 12/2010 |
| CN | 201673270 U | 12/2010 |
| CN | 201811310 U | 4/2011 |
| CN | 202614398 U | 12/2012 |
| CN | 103009006 A | 4/2013 |
| CN | 202885995 U | 4/2013 |
| CN | 103156619 A | 6/2013 |
| CN | 103443602 A | 12/2013 |
| CN | 103814280 A | 5/2014 |
| CN | 203858039 U | 10/2014 |
| CN | 204020470 U | 12/2014 |
| CN | 204172803 U | 2/2015 |
| CN | 204373714 U | 6/2015 |
| CN | 205138653 U | 4/2016 |
| CN | 106052887 A | 10/2016 |
| CN | 106323031 A | 1/2017 |
| CN | 205981474 U | 2/2017 |
| CN | 206084340 U | 4/2017 |
| CN | 206132244 U | 4/2017 |
| CN | 206216629 U | 6/2017 |
| CN | 107478351 A | 12/2017 |
| CN | 206771570 U | 12/2017 |
| CN | 107615026 A | 1/2018 |
| CN | 206968565 U | 2/2018 |
| CN | 207186612 U | 4/2018 |
| CN | 207263201 U | 4/2018 |
| CN | 207280620 U | 4/2018 |
| CN | 207335891 U | 5/2018 |
| CN | 108181366 A | 6/2018 |
| CN | 207556690 U | 6/2018 |
| CN | 207686847 U | 8/2018 |
| CN | 207849444 U | 9/2018 |
| CN | 207923322 U | 9/2018 |
| CN | 108716956 A | 10/2018 |
| CN | 207990823 U | 10/2018 |
| CN | 108896240 A | 11/2018 |
| CN | 108896631 A | 11/2018 |
| CN | 108910090 A | 11/2018 |
| CN | 109187627 A | 1/2019 |
| CN | 109253745 A | 1/2019 |
| CN | 208537058 U | 2/2019 |
| CN | 109393836 A | 3/2019 |
| CN | 208621207 U | 3/2019 |
| CN | 208751721 U | 4/2019 |
| CN | 208765188 U | 4/2019 |
| CN | 109764975 A | 5/2019 |
| CN | 208901000 U | 5/2019 |
| CN | 208902140 U | 5/2019 |
| CN | 109931485 A | 6/2019 |
| CN | 208937199 U | 6/2019 |
| CN | 209043472 U | 6/2019 |
| CN | 109958362 A | 7/2019 |
| CN | 209071557 U | 7/2019 |
| CN | 209083723 U | 7/2019 |
| CN | 209117196 U | 7/2019 |
| CN | 110160489 A | 8/2019 |
| CN | 209247182 U | 8/2019 |
| CN | 209247187 U | 8/2019 |
| CN | 209541921 U | 10/2019 |
| CN | 209705571 U | 11/2019 |
| CN | 209705664 U | 11/2019 |
| CN | 210400641 U | 4/2020 |
| CN | 111332216 A | 6/2020 |
| CN | 210822069 U | 6/2020 |
| CN | 111637927 A | 9/2020 |
| CN | 211478395 U | 9/2020 |
| CN | 211527649 U | 9/2020 |
| CN | 211627431 U | 10/2020 |
| CN | 212133899 U | 12/2020 |
| DE | 3045143 A1 | 7/1982 |
| DE | 20220074 U1 | 3/2003 |
| DE | 20311050 U1 | 12/2003 |
| DE | 10250196 A1 | 5/2004 |
| DE | 202005008703 U1 | 8/2005 |
| DE | 102005045216 A1 | 4/2007 |
| DE | 102006062220 A1 | 6/2008 |
| EP | 0141181 A2 | 5/1985 |
| EP | 0756913 A2 | 2/1997 |
| EP | 1267151 A1 | 12/2002 |
| EP | 2669645 A1 | 12/2013 |
| EP | 2765401 A1 | 8/2014 |
| FR | 2223682 A1 | 10/1974 |
| FR | 2373782 A1 | 7/1978 |
| FR | 2906837 A1 | 4/2008 |
| FR | 2911958 A1 | 8/2008 |
| GB | 0114474 A | 4/1918 |
| GB | 1184036 A | 3/1970 |

(56) References Cited

FOREIGN PATENT DOCUMENTS

| | | | |
|---|---|---|---|
| GB | 2563984 | A | 1/2019 |
| GB | 2563985 | A | 1/2019 |
| JP | H0552668 | A | 3/1993 |
| JP | H0623949 | A | 2/1994 |
| JP | 3098007 | B1 | 10/2000 |
| JP | 2003227743 | A | 8/2003 |
| JP | 2004340625 | A | 12/2004 |
| JP | 2005062014 | A | 3/2005 |
| JP | 3687120 | B2 | 8/2005 |
| JP | 3857153 | B2 | 12/2006 |
| JP | 2012159304 | A | 8/2012 |
| JP | 2013079710 | A | 5/2013 |
| JP | 2014178258 | A | 9/2014 |
| JP | 5658581 | B2 | 1/2015 |
| JP | 5800660 | B2 | 10/2015 |
| JP | 2016033430 | A | 3/2016 |
| JP | 2016183906 | A | 10/2016 |
| JP | 2020098282 | A | 6/2020 |
| JP | 6726265 | B2 | 7/2020 |
| KR | 950033666 | A | 12/1995 |
| KR | 970028892 | A | 6/1997 |
| KR | 19990054010 | A | 7/1999 |
| KR | 200438729 | Y1 | 3/2008 |
| KR | 20090105092 | A | 10/2009 |
| KR | 20100005383 | A | 1/2010 |
| KR | 101008316 | B1 | 1/2011 |
| KR | 20140083985 | A | 7/2014 |
| KR | 101911986 | B1 | 10/2018 |
| KR | 20190136637 | A | 12/2019 |
| NO | 321400 | B1 | 5/2006 |
| TW | M340448 | U | 9/2008 |
| WO | WO-2005080891 | A1 | 9/2005 |
| WO | WO-2012102279 | A1 | 8/2012 |
| WO | WO-2013051683 | A1 | 4/2013 |
| WO | WO-2018198069 | A1 | 11/2018 |

OTHER PUBLICATIONS

Notice of Acceptance for AU2021201316 that is the parent application to the instant application; dated Feb. 23, 2023, 3 pages.
Canadian Office Action for CA3111127 which claims priority to the same parent application as the instant application; dated Mar. 17, 2022; 5 pages.
Vivosun 4.x2 Grow Tent Basic Kit; https: www.vivosun.com/pages/vivosun-purpose), Copyright 2022; 19 pages.
Ds18b20 temperature sensor holder 3d models; stlfinder.com; accessed Apr. 13, 2022; 5 pages.
Examination Report for Australian application No. 2021201316 which is the parent application to the instant application; dated Jun. 2, 2022; 6 pages.
"Extreme Temperature Sensors" particularly "Wireless Temperature Sensor, Magnet Mounted—Leap Sensors", available Aug. 14, 2020, https:www.phaseivengr.com/products/sensors/temperature/extreme-temperature/.
Examination Report for AU2021201316 that is the parent application to the instant application; dated Sep. 30, 2022, 5 pages.

* cited by examiner

BRACKET FOR TEMPERATURE SENSOR

CROSS-REFERENCE TO RELATED APPLICATIONS

This application claims priority to and the benefit of Australian Patent Application No. 2021201316 filed Mar. 1, 2021 and Canadian Patent Application No. 3111127 filed Mar. 5, 2021. The entire disclosures of the above patent applications are incorporated herein by reference.

FIELD

The present disclosure relates to brackets for temperature sensors.

BACKGROUND

This section provides background information related to the present disclosure which is not necessarily prior art.

Wireless temperature sensors are typically designed to be used in different locations. But wireless temperature sensors are not always equipped with the features necessary to enable the wireless temperature sensors to be mounted at the best or most preferred locations in different installations.

SUMMARY

This section provides a general summary of the disclosure and is not a comprehensive disclosure of its full scope or all of its features.

Disclosed are exemplary embodiments of mounting brackets or clips (broadly, a support) for temperature sensors. The mounting brackets are configured with multiple mounting features that enable temperature sensors to be mounted at different locations. In an exemplary embodiment, a mounting bracket includes first and second mounting features or means configured for selectively attaching the bracket and temperature sensor to a surface via the first mounting feature, or hanging the bracket and temperature sensor from a fixture via the second mounting feature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals may indicate corresponding (though not necessarily identical) parts throughout the several views of the drawings.

DETAILED DESCRIPTION

Example embodiments will now be described more fully with reference to the accompanying drawings.

As recognized herein, wireless temperature sensors are not always equipped with the features necessary to enable the wireless temperature sensors to be mounted at ideal or preferred locations in different installations. To address and/or alleviate these issues, exemplary embodiments are disclosed herein of mounting brackets or clips (broadly, supports) configured with multiple mounting features that enable wireless temperature sensors to be mounted at different locations. In such exemplary embodiments, the mounting bracket includes a first mounting feature or means (e.g., one or more magnets, etc.) for affixing the bracket and sensor to a generally flat surface (e.g., ferrous metal flat surface or wall, etc.) and a second mounting feature or means (e.g., opening, hanging hole, hook, latch, clasp, etc.) for hanging or suspending the bracket and sensor from a fixture (e.g., ventilated shelving, wire shelving, etc.) in a given location.

Figure 1:
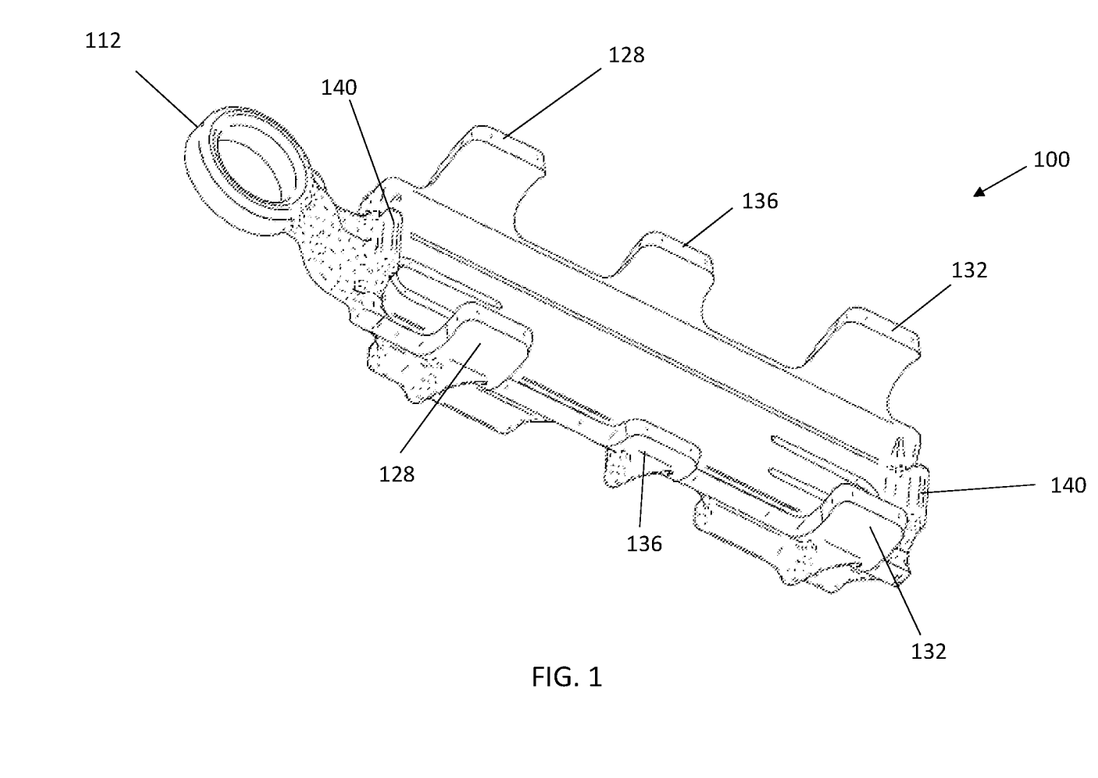
FIG. 1 is a perspective view of a mounting bracket or clip (broadly, a support) for a temperature sensor according to an exemplary embodiment.
Figure 2:
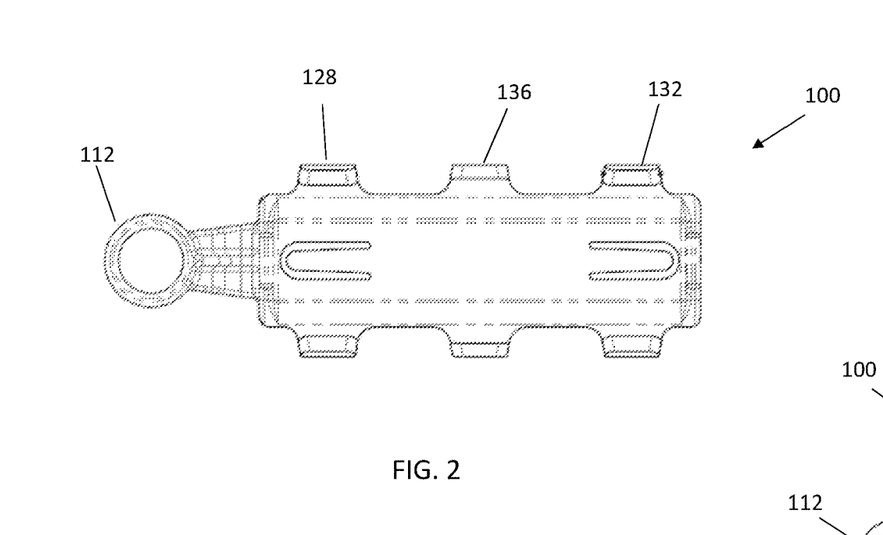
FIG. 2 is a top view of the mounting bracket shown in FIG. 1.
Figure 3:
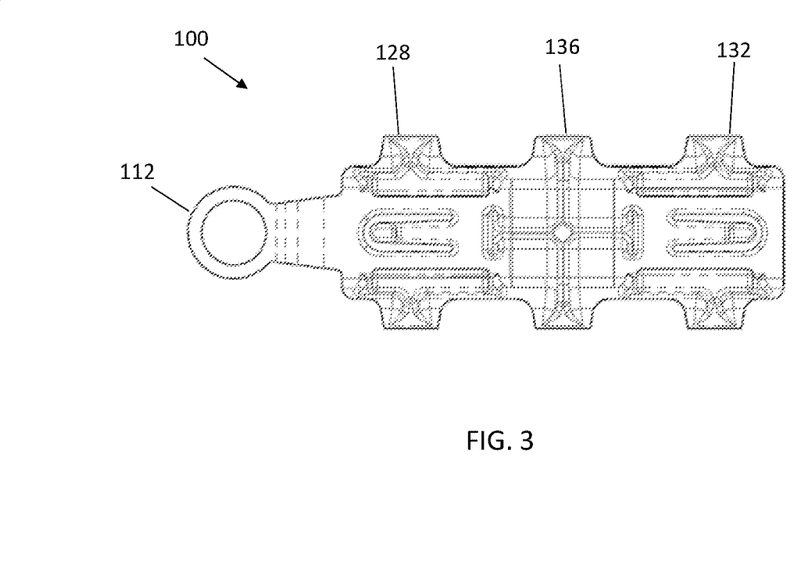
FIG. 3 is a bottom view of the mounting bracket shown in FIG. 1.
Figure 4:
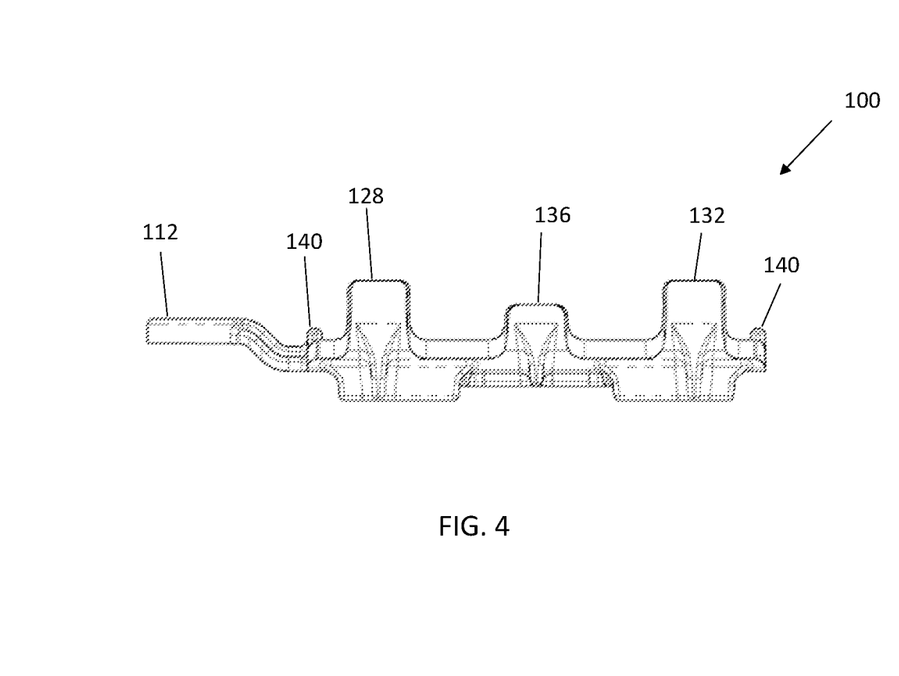
FIG. 4 is a side view of the mounting bracket shown in FIG. 1.
Figure 5:
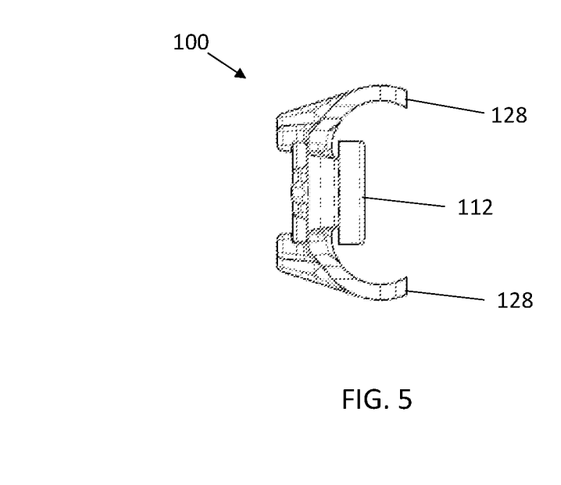
FIG. 5 is an end view of the mounting bracket shown in FIG. 1.

With reference now to the figures, FIG. 1 illustrates an exemplary embodiment of a mounting bracket or clip 100 (broadly, a support) embodying one or more aspects of the present disclosure. The mounting bracket 100 includes multiple mounting features or means for mounting a temperature sensor (e.g., wireless temperature sensor 104 shown in FIGS. 6-11, etc.) at different locations.

In this exemplary embodiment, the mounting bracket 100 includes first and second mounting features 108, 112 configured for selectively attaching the bracket 100 and temperature sensor 104 to a generally flat surface via the first mounting feature 108 or hanging the bracket 100 and temperature sensor 104 from a fixture via the second mounting feature 112. With the different mounting features, the bracket 100 may be usable for mounting a temperature sensor at a location out of harm's way, e.g., away from moving items like pallets or large boxes on shelves, etc.

As shown in FIGS. 6, 8, 10, and 11, the mounting bracket 100 includes two spaced apart magnets 108 along the back of the bracket 100, for magnetically attaching or affixing the bracket 100 and wireless temperature sensor 104 to a ferrous surface. By way of example, the magnets 108 may be used for affixing the bracket 100 and sensor 104 to a generally flat ferrous surface (e.g., steel wall, ferrous metal fixture, etc.) within a walk-in freezer or cooler or other refrigerated space (e.g., in a restaurant, etc.). In other exemplary embodiments, a mounting bracket may be configured differently, such as including more or less than two magnets and/or other mounting features for affixing the bracket to a generally flat surface.

In this exemplary embodiment, the mounting bracket 100 and magnets 108 are configured such that the magnets 108 are removably coupled to the bracket 100. Accordingly, the magnets 108 may be removed from the bracket 100, such as when the bracket 100 and sensor 104 will be hung or suspended from a fixture using the bracket's second mounting feature 112. In other exemplary embodiments, a mounting bracket may be configured differently, such as including more or less than two magnets, magnets that are not readily removable, and/or other mounting features for affixing the bracket to a generally flat surface.

Figure 7:
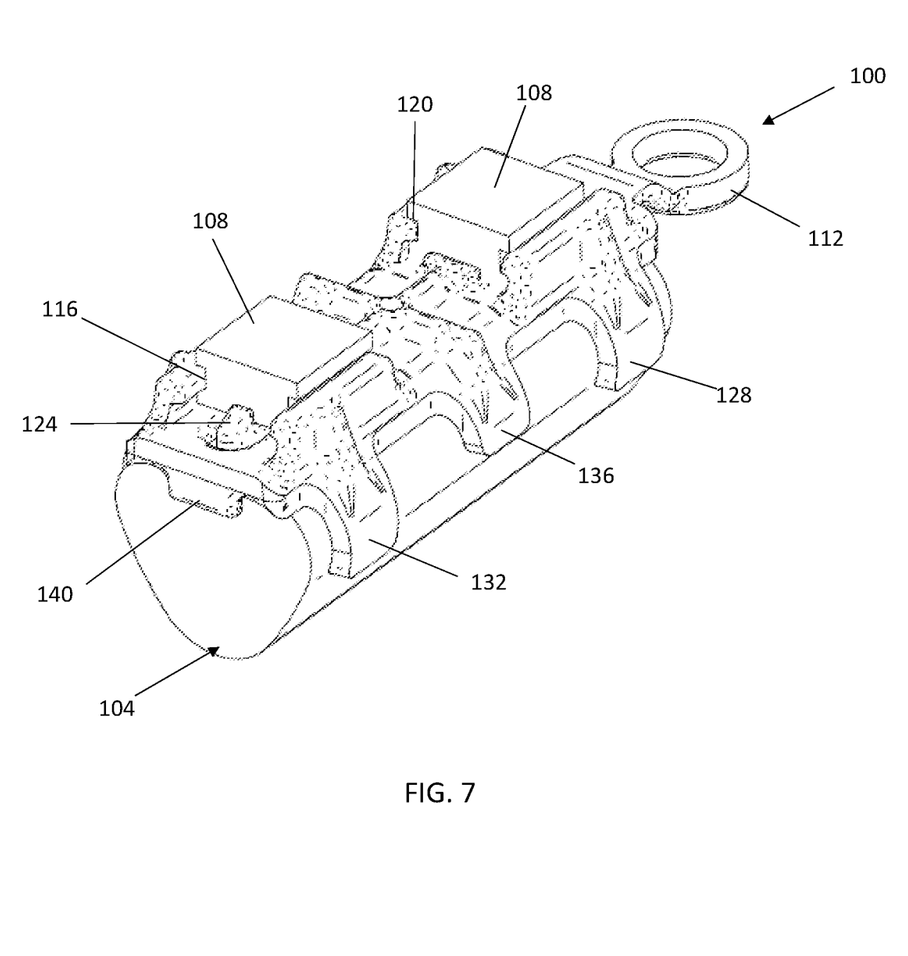
FIG. 7 is another perspective view of the mounting bracket and wireless temperature sensor shown in FIG. 6.
Figure 8:
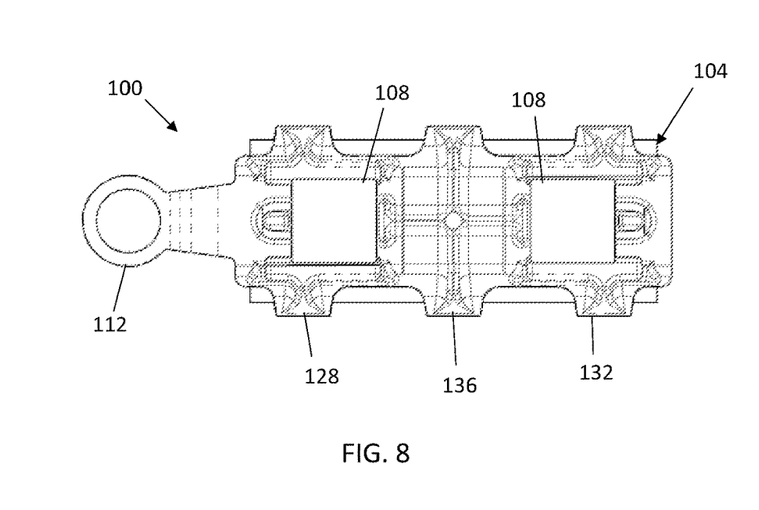
FIG. 8 is a top view of the mounting bracket and wireless temperature sensor shown in FIG. 6.
Figure 9:
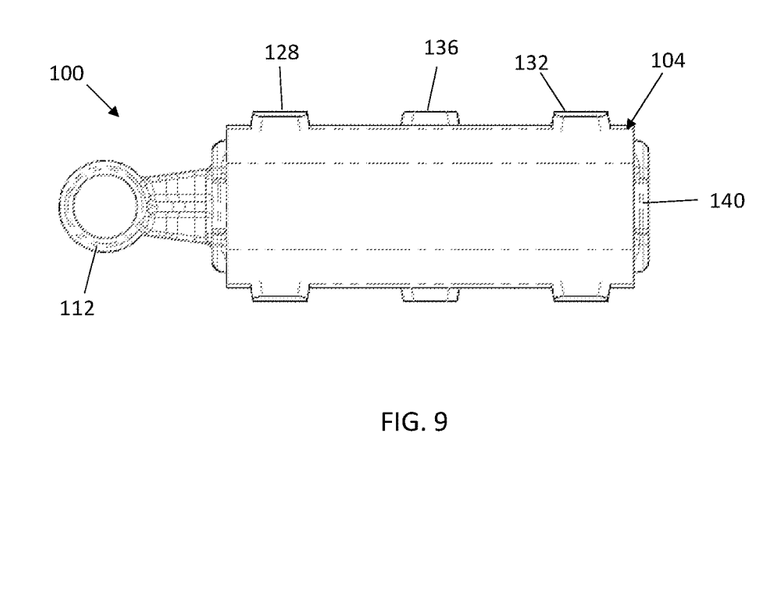
FIG. 9 is a bottom view of the mounting bracket and wireless temperature sensor shown in FIG. 6.
Figure 10:
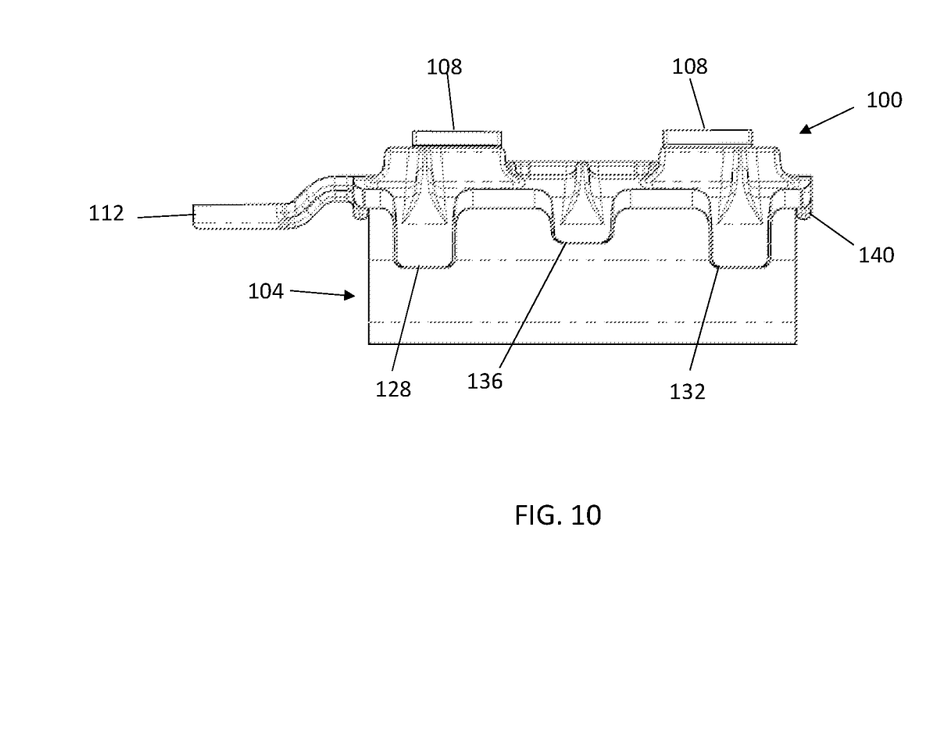
FIG. 10 is a side view of the mounting bracket and wireless temperature sensor shown in FIG. 6.
Figure 11:
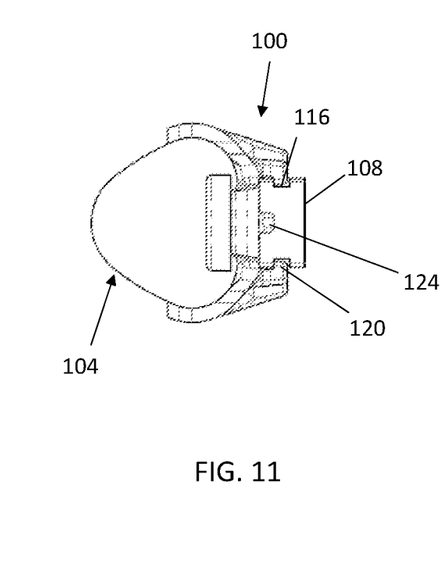
FIG. 11 is an end view of the mounting bracket and wireless temperature sensor shown in FIG. 6.
Figure 12:
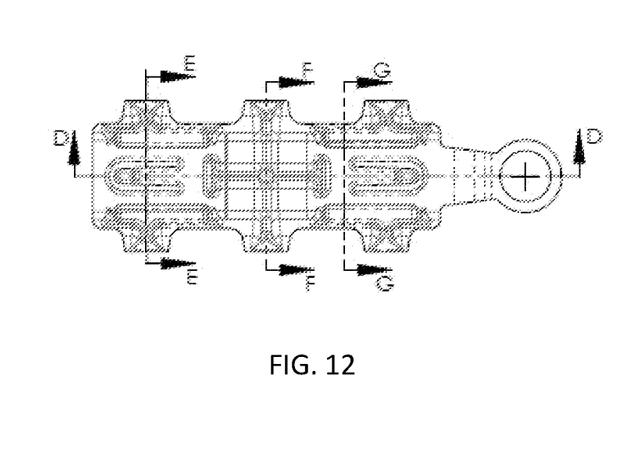
FIG. 12 is a bottom view of the mounting bracket shown in FIG. 1.
Figure 13:
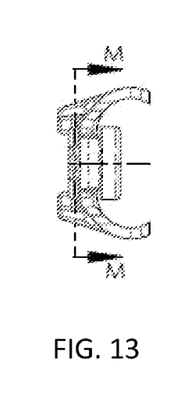
FIG. 13 is an end view of the mounting bracket shown in FIG. 1.
Figure 14:
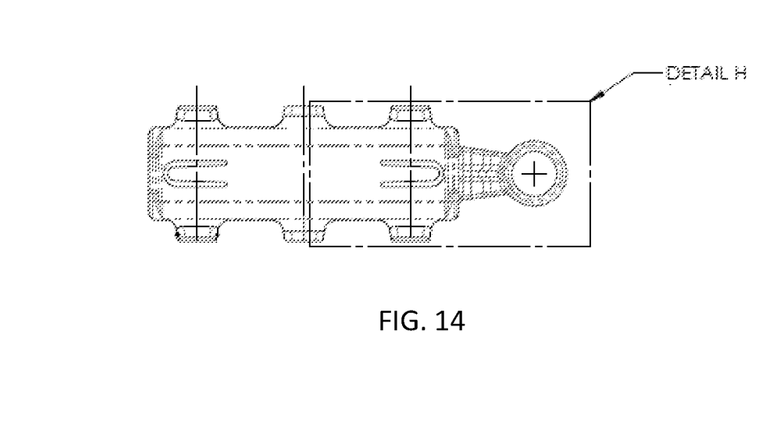
FIG. 14 is a top view of the mounting bracket shown in FIG. 1.
Figure 15:
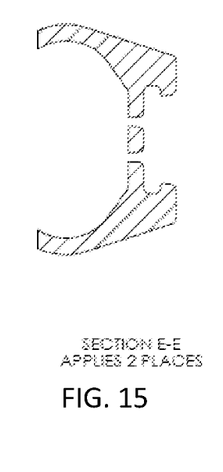
FIG. 15 is a cross-sectional view of the mounting bracket taken along the line E-E of FIG. 12.
Figure 16:
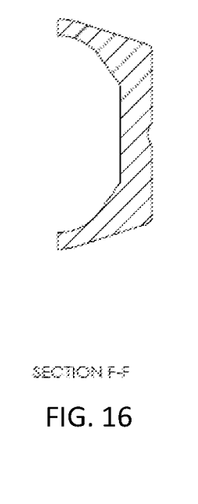
FIG. 16 is a cross-sectional view of the mounting bracket taken along the line F-F of FIG. 12.
Figure 17:
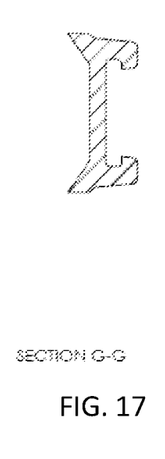
FIG. 17 is a cross-sectional view of the mounting bracket taken along the line G-G of FIG. 12.
Figure 18:
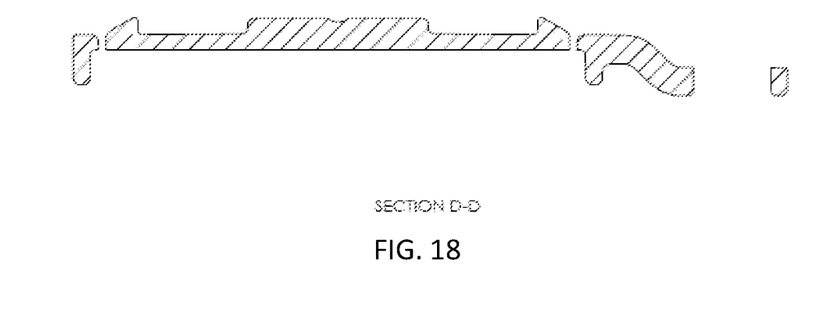
FIG. 18 is a cross-sectional view of the mounting bracket taken along the line D-D of FIG. 12.
Figure 19:
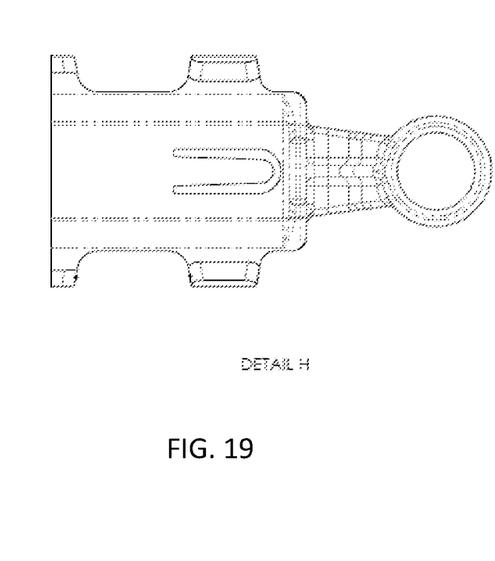
FIG. 19 is a detail view of the portion of the mounting bracket designated H in FIG. 14.
Figure 20:
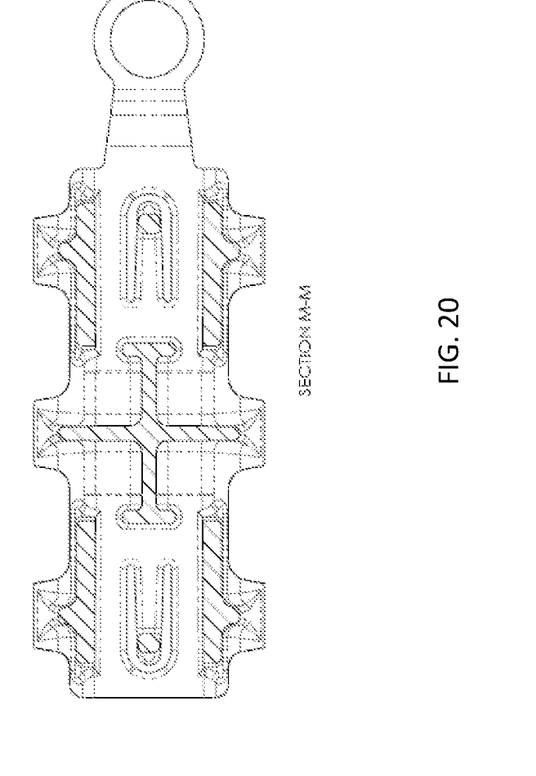
FIG. 20 is a cross-sectional view of the mounting bracket taken along the line M-M of FIG. 13.

As shown in FIGS. 7 and 11, each magnet 108 includes slots or channels 116 along opposite sides such that the magnet has a generally I-shaped profile. The magnet's slots or channels 116 are configured to slidingly receive corresponding rails 120 (broadly, protruding portions) of the mounting bracket 100 and thereby removably couple the magnets 108 to the bracket 100. The mounting bracket 100 also includes stops 124 (broadly, protruding portions) configured to inhibit sliding of the magnets 108 off the bracket's rails 120. The stops 124 thus help to retain the magnets 108 in place and prevent the inadvertent dislodging or removal of the magnets 108 from the bracket 100.

Figure 6:
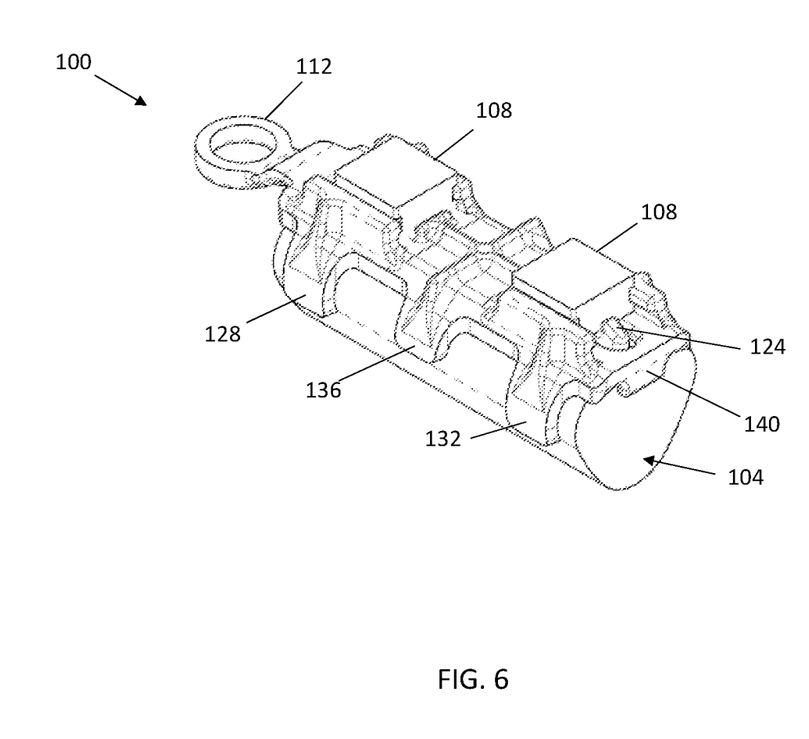
FIG. 6 is a bottom perspective view of the mounting bracket shown in FIG. 1 while holding a wireless temperature sensor according to an exemplary embodiment.

As shown in FIGS. 1, 6, and 7, the mounting bracket 100 includes a hanging hole 112 (broadly, the second mounting feature) along an upper portion of the bracket 100. The hanging hole 112 enables the bracket 100 and wireless temperature sensor 104 to be suspended or hung from a fixture.

By way of example, the bracket 100 and sensor 104 may be hung from ventilated/wire shelving within a walk-in freezer or cooler or other refrigerated space (e.g., in a restaurant, etc.) by using a fastener, clip, or hook (e.g., S-biner carabiner clip, other hook with closure, etc.) that is respectively fastened, clipped, or hooked onto the ventilated/wire shelving and the bracket's hanging hole 112. Or, for example, the bracket 100 and sensor 104 may be tied to and hung from ventilated/wire shelving by tying wire or other material to the ventilated/wire shelving and the bracket's hanging hole 112.

In other exemplary embodiments, a mounting bracket may be configured differently, such as including other mounting features (e.g., a hook, latch, clasp, etc.) for hanging or suspending the bracket from a fixture at a given location. For example, the bracket may include an upper hook shaped portion and latch. The hook shaped portion and latch may be integrally formed (e.g., molded, etc.) with the bracket such that the bracket, hook shaped portion, and latch have a monolithic, single component construction.

The mounting bracket 100 includes upper and lower sidewall portions 128, 132 (broadly, retention members) configured for retaining or holding the sensor 104 in the bracket 100. As shown in FIGS. 1, 5, 6, 7, and 11, the upper sidewall portions 128 comprise two generally opposing spaced-apart sidewall portions that are rounded, curved, and/or generally define an upper U-shaped channel or cradle therebetween. Likewise, the lower sidewall portions 132 comprise two generally opposing spaced-apart sidewall portions that are rounded, curved, and/or generally define a lower U-shaped channel or cradle therebetween. The curvature of the upper and lower sidewall portions 128, 132 may substantially match and/or correspond with the curvature of the corresponding portions of the sensor 104.

The bracket 100 is preferably configured (e.g., sized, shaped, etc.) so that there is a tight fit (e.g., snap fit, friction fit, interference fit, etc.) between the bracket's sidewall portions 128, 132 and the wireless temperature sensor 104. The upper and lower sidewall portions 128, 132 may be generally resilient, which resiliency urges the upper and lower sidewall portions 128, 132 to their original or initial positioning after the temperature sensor 104 has been positioned in the bracket 100 between the upper and lower sidewall portions 128, 132.

The mounting bracket 100 also includes middle sidewall portions 136 (broadly, alignment members) configured for helping align the sensor 104 when positioning the sensor 104 in the bracket 100 between the upper and lower sidewall portions 128, 132. In this exemplary embodiment, the middle sidewall portions 136 comprise two generally opposing spaced-apart sidewall portions that are rounded and/or curved. The middle sidewall portions 136 are located along the bracket 100 between the upper and lower sidewall portions 128, 132. The middle sidewall portions 136 are shorter than the upper and lower sidewall portions 128, 132.

The mounting bracket 100 further includes end wall portions 140 (broadly, stops or support members) configured to help inhibit the sensor 104 from moving relative to the bracket 100 after the sensor 104 is securely positioned between and retained in place by the upper and lower sidewall portions 128, 132. In this exemplary embodiment, the end wall portions 140 comprise two generally opposing spaced-apart end wall portions that are generally straight and/or uncurved. The end wall portions 140 are located at upper and lower end portions of the respective upper and lower U-shaped channels or cradle defined generally between the upper and lower sidewall portions 128, 132.

The wireless temperature sensor 104 may be held and retained in place in the bracket 100 solely by the upper and lower sidewall portions 128, 132, middle sidewall portions 136, and end portions 140, e.g., via a snap fit, friction fit, and/or interference fit without requiring mechanical fasteners or adhesives.

In exemplary embodiments, the mounting bracket 100 may be made from plastic, e.g., acrylonitrile butadiene styrene (ABS), injection moldable plastic, thermoplastic, etc. For example, the mounting bracket 100 may be molded (e.g., injection molded, etc.) from acrylonitrile butadiene styrene or other suitable plastic that is cleanable with soaps and alkali type solutions typically used in the food service industry.

With continued reference to FIGS. 6-11, the mounting bracket 100 may be used for mounting the wireless temperature sensor 104, which, in turn, may be configured to communicate via a short-range wireless communication protocol (e.g., Bluetooth, etc.) to a hub (broadly, networking device). The hub may be configured to send the temperature information sensed by the wireless temperature sensor 104 to the cloud via the Internet.

The wireless temperature sensor 104 may include a Bluetooth radio for communicating the sensed temperature information to the hub via Bluetooth (e.g., Bluetooth Low Energy (BLE)). Alternatively, the mounting bracket 100 may be used for mounting other wireless temperature sensors configured to communicate using other suitable communication protocols. Accordingly, the mounting brackets disclosed herein should not necessarily be limited to use with only Bluetooth wireless temperature sensors for refrigeration use.

In exemplary implementations, the mounting bracket 100 and the wireless temperature sensor 104 may be used for cold chain operations, e.g., for food and/or medical applications, etc. For example, one or more mounting brackets disclosed herein may be used for mounting one or more wireless temperature sensors, which may be connected via a router with a first cloud. In this example, temperature information obtained by the one or more wireless temperature sensors may be communicated via the router to the first cloud. The temperature information may then be communicated from the first cloud to a second cloud for analysis, reporting, sending notifications to users, etc.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping, or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mounting bracket for a wireless temperature sensor for use within a walk-in freezer, walk-in cooler, or other refrigerated space, the wireless temperature sensor having a generally triangular cross-section, the mounting bracket comprising:
    retention members configured for releasably retaining at least one side of a plurality of sides defining the generally triangular cross-section of the wireless temperature sensor in the mounting bracket; and
    first and second mounting features configured such that the mounting bracket and the wireless temperature sensor retained in the mounting bracket by the retention members are selectively:
        configured to be attached to a generally flat and/or ferrous surface via the first mounting feature of the mounting bracket, wherein the first mounting feature comprises one or more magnets removably coupled to the mounting bracket and disposed along a back of the mounting bracket for magnetically attaching the mounting bracket to a ferrous surface; and
        configured to be hung from a fixture via the second mounting feature of the mounting bracket.

2. The mounting bracket of claim 1, wherein the one or more magnets comprise at least two magnets spaced apart from each other along the back of the mounting bracket.

3. The mounting bracket of claim 1, wherein the one or more magnets are configured for magnetically attaching the mounting bracket a ferrous metal wall or fixture within a walk-in freezer, walk-in cooler, or other refrigerated space.

4. The mounting bracket of claim 1, wherein the one or more magnets are removably coupled to the mounting bracket, such that the one or more magnets are removable from the mounting bracket when not being used to magnetically attach the mounting bracket to the ferrous surface.

5. The mounting bracket of claim 4, wherein:
    each said magnet includes slots or channels along opposite sides of the magnet such that the magnet has a generally I-shaped profile;
    the slots or channels are configured to slidingly receive rails of the mounting bracket therein to thereby removably couple the magnet to the mounting bracket; and
    the mounting bracket also includes one or more stops configured to inhibit sliding of the magnet off the rails of the mounting bracket, to thereby help to retain the magnet to the mounting bracket.

6. The mounting bracket of claim 1, wherein the second mounting feature comprises a hanging hole along an upper portion of the mounting bracket.

7. The mounting bracket of claim 6, wherein the hanging hole is configured to receive a portion of a shelf, wire, clip, hook, or fastener therethrough for respectively tying, clipping, hooking, or fastening the mounting bracket to ventilated and/or wire shelving.

8. The mounting bracket of claim 1, wherein the retention members are configured for retaining the wireless temperature sensor having the generally triangular cross-section in the mounting bracket via a snap fit, friction fit, and/or interference fit between the retention members and corresponding portions of at least two sides of the plurality of sides defining the generally triangular cross-section of the wireless temperature sensor.

9. The mounting bracket of claim 8, wherein the retention members are configured to retain the wireless temperature sensor having the generally triangular cross-section in the mounting bracket solely via the snap fit, friction fit, and/or interference fit without requiring mechanical fasteners or adhesives.

10. The mounting bracket of claim 8, wherein the retention members comprise sidewall portions that are rounded, curved, and/or generally define a U-shaped channel or cradle therebetween and that are configured such that opposing portions of at least two sides of the plurality of sides defining the generally triangular cross-section of the wireless temperature sensor are positionable between the sidewall portions of the retention members.

11. The mounting bracket of claim 8, wherein the retention members comprise:
    generally opposing spaced-apart upper sidewall portions that are rounded, curved, and/or generally define an upper U-shaped channel or cradle therebetween and that are configured such that opposing upper portions of at least two sides of the plurality of sides defining the generally triangular cross-section of the wireless temperature sensor are positionable between the upper sidewall portions of the retention members; and
    generally opposing spaced-apart lower sidewall portions that are rounded, curved, and/or generally define a lower U-shaped channel or cradle therebetween and that are configured such that opposing lower portions of at least two sides of the plurality of sides defining the generally triangular cross-section of the wireless temperature sensor are positionable between the lower sidewall portions of the retention members.

12. The mounting bracket of claim 11, further comprising generally opposing spaced apart middle sidewall portions located along the mounting bracket between the upper and lower sidewall portions of the retention members, the middle sidewall portions configured for helping align the wireless temperature sensor having the generally triangular cross-section in the mounting bracket such that the wireless temperature sensor's opposing upper portions and opposing lower portions are respectively between the upper and lower sidewall portions of the retention members.

13. The mounting bracket of claim 11, further comprising upper and lower end wall portions respectively adjacent the upper and lower sidewall portions of the retention members, the upper and lower end wall portions configured to inhibit the wireless temperature sensor from moving relative to the upper and lower sidewall portions of the retention members after the opposing upper portions and opposing lower portions of the wireless temperature sensor are respectively retained between the upper and lower sidewall portions of the retention members.

14. The mounting bracket of claim 1, wherein the retention members are resilient, which resiliency urges the retention members to their original or initial positioning after the wireless temperature sensor having the generally triangular cross-section has been positioned in the mounting bracket such that opposing portions of at least two sides of the plurality of sides defining the generally triangular cross-section of the wireless temperature sensor are between the retention members.

15. The mounting bracket of claim 1, further comprising:
alignment members configured for helping align the wireless temperature sensor in the mounting bracket such that opposing portions of at least two sides of the plurality of sides defining the generally triangular cross-section of the wireless temperature sensor are between the retention members; and/or
stops configured to inhibit the wireless temperature sensor from moving relative to the retention members to the mounting bracket after opposing portions of at least two sides of the plurality of sides defining the generally triangular cross-section of the wireless temperature sensor are retained between the retention members.

16. The mounting bracket of claim 1, wherein the mounting bracket comprises acrylonitrile butadiene styrene.

17. The mounting bracket of claim 1, wherein:
the one or more magnets are configured for magnetically attaching the mounting bracket to a ferrous metal wall or fixture within a walk-in freezer, walk-in cooler, or other refrigerated space; and
the second mounting feature comprises a hanging hole along an upper portion of the mounting bracket, the hanging hole configured to receive a portion of a shelf, wire, clip, hook, or fastener therethrough for respectively tying, clipping, hooking, or fastening the mounting bracket to ventilated and/or wire shelving within the walk-in freezer, walk-in cooler, or other refrigerated space;
whereby the wireless temperature sensor having a generally triangular cross-section retained in the mounting bracket by the retention members is selectively:
magnetically attachable to the ferrous metal wall or fixture within the walk-in freezer, walk-in cooler, or other refrigerated space via the one or more magnets of the mounting bracket; and
hangable from the ventilated and/or wire shelving within the walk-in freezer, walk-in cooler, or other refrigerated space via the hanging hole of the mounting bracket.

18. A support for mounting a wireless temperature sensor having a generally triangular cross-section within a walk-in freezer, walk-in cooler, or other refrigerated space, the support comprising:
retention members configured for retaining the wireless temperature sensor having the generally triangular cross-section in the support via a snap fit, friction fit, and/or interference fit between the retention members and corresponding portions of at least two sides of a plurality of sides defining the generally triangular cross-section of the wireless temperature sensor;
one or more magnets removably coupled to the support and disposed along a back of the support, the one or more magnets configured such that the support and the wireless temperature sensor retained in the support by the retention members are magnetically attachable to a ferrous surface within the walk-in freezer, walk-in cooler, or other refrigerated space; and
an opening along an upper portion of the support, the opening configured such that the support and the wireless temperature sensor retained in the support by the retention members are hangable from a fixture surface within the walk-in freezer, walk-in cooler, or other refrigerated space.

19. The support of claim 18, wherein the one or more magnets comprise at least two magnets spaced apart from each other and removably coupled to the support, the at least two magnets configured for magnetically attaching the support and the wireless temperature sensor retained in the support by the retention members to a ferrous metal wall or fixture within the walk-in freezer, walk-in cooler, or other refrigerated space.

20. The support of claim 18, wherein:
each said magnet includes slots or channels along opposite sides of the magnet such that the magnet has a generally I-shaped profile;
the slots or channels are configured to slidingly receive rails of the support therein to thereby removably couple the magnet to the support; and
the support includes one or more stops configured to inhibit sliding of the magnet off the rails of the support, to thereby help to retain the magnet to the support.

21. The support of claim 18, wherein the opening along the upper portion of the support is configured to receive a portion of a shelf, wire, clip, hook, or fastener therethrough for respectively tying, clipping, booking, or fastening the support and the wireless temperature sensor retained in the support by the retention members to ventilated and/or wire shelving within the walk-in freezer, walk-in cooler, or other refrigerated space.

22. The support of claim 18, wherein the retention members are resilient, which resiliency urges the retention members to their original or initial positioning after the wireless temperature sensor having the generally triangular cross-section has been positioned in the support such that the corresponding portions of the at least two sides of the plurality of sides defining the generally triangular cross-section of the wireless temperature sensor are between the retention members thereby enabling the retention members to retain the wireless temperature sensor in the support solely via the snap fit, friction fit, and/or interference fit without requiring mechanical fasteners or adhesives.

23. The support of claim 18, further comprising:
alignment members configured for helping align the wireless temperature sensor in the support such that the corresponding portions of the at least two sides of the plurality of sides defining the generally triangular cross-section of the wireless temperature sensor are between the retention members; and/or
stops configured to inhibit the wireless temperature sensor from moving relative to the retention members to the support after the corresponding portions of the at least two sides of the plurality of sides defining the generally triangular cross-section of the wireless temperature sensor are retained between the retention members.

24. The support of claim 18, wherein the retention members comprise:
generally opposing spaced-apart upper sidewall portions that are rounded, curved, and/or generally define an upper U-shaped channel or cradle therebetween and that are configured such that opposing upper portions of the at least two sides of the plurality of sides defining the generally triangular cross-section of the wireless temperature sensor are positionable between the upper sidewall portions of the retention members; and
generally opposing spaced-apart lower sidewall portions that are rounded, curved, and/or generally define a lower U-shaped channel or cradle therebetween and that are configured such that opposing lower portions of the at least two sides of the plurality of sides defining the generally triangular cross-section of the wireless temperature sensor are positionable between the lower sidewall portions of the retention members.

25. The support of claim 24, further comprising generally opposing spaced apart middle sidewall portions located along the support between the upper and lower sidewall portions of the retention members, the middle sidewall portions configured for helping align the wireless temperature sensor having the generally triangular cross-section in the support such that the wireless temperature sensor's opposing upper portions and opposing lower portions are respectively between the upper and lower sidewall portions of the retention members.

26. The support of claim 24, further comprising upper and lower end wall portions respectively adjacent the upper and lower sidewall portions of the retention members, the upper and lower end wall portions configured to inhibit the wireless temperature sensor from moving relative to the upper and lower sidewall portions of the retention members after the opposing upper portions and opposing lower portions of the wireless temperature sensor are respectively retained between the upper and lower sidewall portions of the retention members.

27. The support of claim 18, wherein the support comprises acrylonitrile butadiene styrene.

\* \* \* \* \*